(12) United States Patent
Nagai

(10) Patent No.: US 8,018,556 B2
(45) Date of Patent: Sep. 13, 2011

(54) LIQUID CRYSTAL DISPLAY DEVICE HAVING A BIAXIAL FIRST ANISOTROPIC FILM AND A SECOND ANISOTROPIC FILM HAVING AN OPTICAL AXIS IN A THICKNESS DIRECTION

(75) Inventor: Hiroshi Nagai, Tokyo (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 557 days.

(21) Appl. No.: 12/245,387

(22) Filed: Oct. 3, 2008

(65) Prior Publication Data

US 2009/0091692 A1    Apr. 9, 2009

(30) Foreign Application Priority Data

Oct. 4, 2007    (JP) ................. 2007-260738

(51) Int. Cl.
*G02F 1/1335*    (2006.01)
(52) U.S. Cl. .................... 349/118; 349/119
(58) Field of Classification Search .......... 349/117, 349/118
See application file for complete search history.

(56) References Cited

U.S. PATENT DOCUMENTS
2005/0128411 A1 *    6/2005    Nagai et al. .................. 349/141

FOREIGN PATENT DOCUMENTS
JP    2005-196149 A    7/2005
* cited by examiner

*Primary Examiner* — Mark A Robinson
*Assistant Examiner* — Paul C Lee
(74) *Attorney, Agent, or Firm* — Sughrue Mion, PLLC

(57) ABSTRACT

A LCD device includes a LC cell including a homogeneously-oriented LC layer and a pair of transparent substrates. A pair of polarizing films sandwiching therebetween the LC cell. A protective layer of the light-emitting-side polarizing film has an optical isotropy, and protective layer of the light-incident-side polarizing film has an thickness-wise retardation of 20 to 90 nm. A biaxial optical anisotropic film is interposed between the light-emitting-side polarizing film and the LC cell, and a second optical anisotropic film for cancelling the wavelength dispersion caused by the biaxial optical anisotropic film is interposed between the light-incident-side polarizing film and the LC cell.
The biaxial optical anisotropic film has three-dimensional refractive indexes ns, nf and nz that satisfy therebetween $(ns-nz)/(ns-nf) \leq 0.5\%$.

14 Claims, 4 Drawing Sheets

LIQUID CRYSTAL DISPLAY DEVICE HAVING A BIAXIAL FIRST ANISOTROPIC FILM AND A SECOND ANISOTROPIC FILM HAVING AN OPTICAL AXIS IN A THICKNESS DIRECTION

This application is based upon and claims the benefit of priority from Japanese patent application No. 2007-260738 filed on Oct. 4, 2007, the disclosure of which is incorporated herein in its entirety by reference.

FIELD OF THE INVENTION

The present invention relates to a liquid crystal display (LCD) device and, more particularly, to a LCD device including a liquid crystal (LC) cell configured by a LC layer and a pair of transparent substrates sandwiching therebetween the LC layer, and a pair of polarizing films sandwiching therebetween the LC cell.

BACKGROUND ART

Normally-black-mode LCD devices are known which include a LC cell including a LC layer having a homogeneous initial orientation and a pair of transparent (glass) substrates, and a pair of polarizing films having optical axes extending perpendicular to each other. This type of LCD devices include an IPS (in-plane-switching)-mode LCD device and a FFS (fringe-field switching)-mode LCD device. These LCD devices operate for image display by applying an electric field to the LC layer in a direction parallel to the glass substrates to control the orientation of the LC layer. The configuration of the IPS-mode or FFS-mode LCD device wherein the orientation of the LC layer is parallel to the glass substrates allows the LCD device to achieve a higher viewing angle characteristic compared to a TN (twisted-nematic)-mode LCD device.

It is known that a leakage light and/or chromaticity shift (coloring) is observed in the IPS-mode or FFS-mode LCD device, as viewed in the direction of an azimuth angle of 45 degrees, for example, with respect to the polarization direction of the pair of polarizing films during display of a dark state (black). There is a known technique for solving this problem by using an optical compensation film, which suppresses the leakage of light and chromaticity shift as viewed in a slanted viewing direction during display of a dark state (for example, refer to Patent Publication JP-2005-196149A (Patent Publication-1)).

FIG. 8 shows the structure of the LCD device described in Patent Publication-1. In FIG. 8 and other accompanying drawings in this application, a solid line shown on a layer (film) represents an optical axis or light transmission axis of the corresponding layer, and a dotted line on a film represents a light absorption axis of the corresponding polarizing film. A blank arrow indicates the direction of backlight incident onto the LCD device.

The LCD device includes a LC cell 210 including a homogeneously-oriented LC layer (not shown) and a pair of glass substrates (not shown) sandwiching therebetween the LC layer. A light-emitting-side polarizing film 204 includes a polarizer 201 configured by a PVA (polyvinyl alcohol) layer, and a pair of protective layers 202, 203 sandwiching therebetween the polarizer 201. A light-incident-side polarizing film 208 includes a polarizer 206 and a pair of protective layers 205, 207 sandwiching therebetween the polarizer 206.

The optical axis (light absorption axis or light transmission axis) of the light-emitting-side polarizing film 204 and optical axis of the light-incident-side polarizing film 208 extend perpendicular to each other. The light absorption axis of the light-incident-side polarizing film 208 and the initial orientation of the LC cell 210 are substantially parallel to each other. The protective layers 202, 203, 207 have an optical axis in the thickness direction thereof, and have a retardation of about 50 nm in the thickness direction thereof. Similarly, the protective layer 205 has an optical axis in the thickness direction thereof, and has a retardation of 0 to 25 nm in the thickness direction thereof.

An optical compensation layer 214 is disposed between the light-emitting-side polarizing film 204 and the LC cell 210. The optical compensation layer 214 has a biaxial anisotropy wherein the refractive index (ns) of the in-plane slow axis of the optical compensation layer 214, the refractive index (nf) of the in-plane fast axis thereof, and the refractive index (nz) in the thickness direction thereof satisfy therebetween the relationship of $(ns-nz)/(ns-nf) \leq 0.5$ and the in-plane retardation Re of the optical compensation layer 214 is in the range of $80 \text{ nm} \leq Re \leq 230 \text{ nm}$. This optical compensation layer 214 is disposed so that the in-plane slow axis is parallel to the initial orientation of the LC layer. It is recited in Patent Publication-1 that the retardation caused in the slanted viewing direction by the protective layer 205 is isotropic and set at a lower value, preferably at 0 nm, whereby the light passed by polarizer 206 is allowed to have a linear polarization during incidence thereof onto the LC layer. The configuration wherein the orientation of the LC layer is parallel to the light incidence surface prevents change of the polarization of incident light, to thereby suppress the chromaticity shift thereof.

In the technique of Patent Publication-1, the range of chromaticity shift is reduced in the slanted viewing direction during display of a dark state. However, there remains a wavelength dependency of the biaxial anisotropy of the optical compensation layer 214 because the optical compensation is achieved only by the optical compensation layer 214 having a positive dispersion characteristic in the birefringence. It should be noted in this configuration that the chromaticity shift arises due to the change of spectrum of the backlight or transmission spectrum of color filters, and thus the retardation of the optical compensation layer having the biaxial anisotropy is adjusted so as to obtain an optimum chromaticity. However, this adjustment of retardation cannot completely remove the chromaticity shift if the blue range and red range in the spectrum of the backlight have therebetween considerably different peak values. In such a case, the wavelength dependency of the optical compensation layer having the biaxial anisotropy must be reduced or completely removed in an ideal case. The removal of the wavelength dependency requires a material having a reverse dispersion characteristic to achieve a smaller retardation in a shorter-wavelength range of the light, and the optical compensation layer having the above configuration is difficult to manufacture from such a material.

SUMMARY OF THE INVENTION

It is an object of the present invention to provide a LCD device which is capable of suppressing the wavelength dispersion characteristic of the LCD device in the slanted viewing direction.

The present invention provides, in a first aspect thereof, a liquid crystal display (LCD) device including:
a liquid crystal (LC) cell including a homogeneously-oriented LC layer and a pair of transparent substrates sandwiching therebetween the LC layer;
a first polarizing film disposed on a light incident side of the LC cell, the first polarizing film including a first polarizer and a pair of first protective layers sandwiching therebetween the polarizer, one of the first protective layers interposed between the first polarizer and the LC cell having an optical isotropy;

a second polarizing film disposed on a light emitting side of the LC cell, the second polarizing film including a second polarizer and a pair of second protective layers sandwiching therebetween the second polarizer, one of the second protective layers interposed between the second polarizer and the LC cell having an in-plane retardation of substantially zero and a thickness-wise retardation of 20 nm to 90 nm:

first and second optical anisotropic films interposed between the LC layer sand the second polarizing film and consecutively disposed from the second polarizing film, the first optical anisotropic film having a biaxial optical anisotropy and refractive indexes of ns, nf and nz in a direction of an in-plane slow axis, in a direction of an in-plane fast axis, and a thickness direction, respectively, the refractive indexes satisfying the relationship of $(ns-nz)/(ns-nf) \leq 0.5$, the second optical anisotropic film having an optical axis substantially perpendicular to a surface of the LC cell, wherein:

the first polarizer has a light absorption axis perpendicular to a light absorption axis of the second polarizer; and the in-plane slow axis of the first optical anisotropic film, an orientation of the LC layer upon absence of an applied voltage and a light transmission axis of the second polarizer are parallel to one another.

The present invention provides, in a second aspect thereof, a liquid crystal display (LCD) device including:

a liquid crystal (LC) cell including a homogeneously-oriented liquid crystal layer and a pair of transparent substrates sandwiching therebetween the liquid crystal layer;

a first polarizing film disposed on a light emitting side of the liquid crystal cell and including a first polarizer, the first polarizing film further including a pair of first protective layers sandwiching therebetween the polarizer, one of the first protective layers interposed between the polarizer and the liquid crystal cell having an optical isotropy, or the first polarizing film further including a first protective layer disposed further than the polarizer as viewed from the liquid crystal cell;

a second polarizing film disposed on a light incident side of the liquid crystal cell, the second polarizing film including a second polarizer and a pair of second protective layers sandwiching therebetween the second polarizer, one of the second protective layers interposed between second polarizer and the liquid crystal cell having an in-plane retardation of substantially zero and a thickness-wise retardation of 20 nm to 90 nm:

a first optical anisotropic film interposed between the liquid crystal layer and the second polarizing film, the first optical anisotropic film having a biaxial optical anisotropy and refractive indexes of ns, nf and nz in a direction of an in-plane slow axis, in a direction of an in-plane fast axis, and a thickness direction, respectively, the refractive indexes satisfying the relationship of $(ns-nz)/(ns-nf) \leq 0.5$;

a second optical anisotropic film having an optical axis substantially perpendicular to a surface of the liquid crystal cell, wherein:

the first polarizer has a light absorption axis perpendicular to a light absorption axis of the second polarizer; and the in-plane slow axis of the first optical anisotropic film, an orientation of the liquid crystal layer upon absence of an applied voltage and a light transmission axis of the second polarizer are parallel to one another.

The above and other objects, features and advantages of the present invention will be more apparent from the following description, referring to the accompanying drawings.

EXEMPLARY EMBODIMENTS

Figure 1:
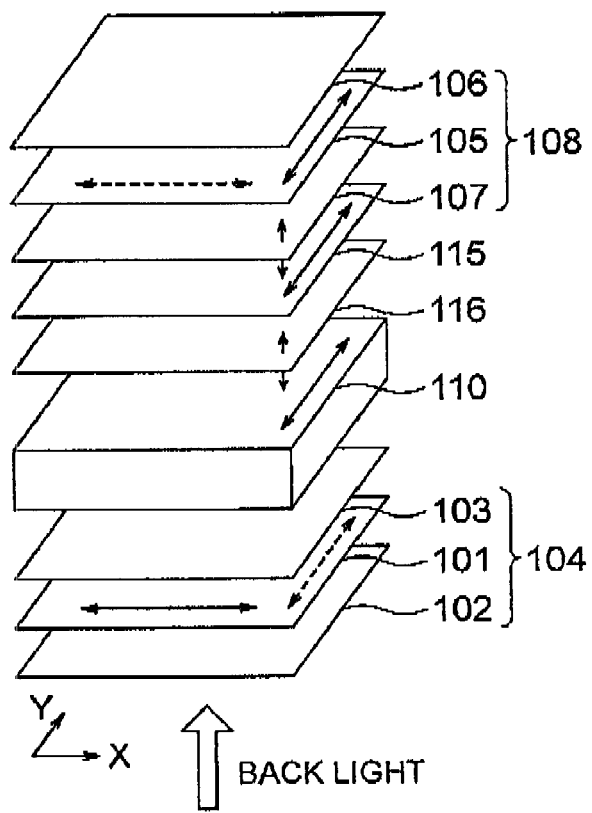
FIG. 1 is a perspective view showing the configuration of a LCD device according to a first embodiment of the present invention.

Now, exemplary embodiments of the present invention will be described with reference to accompanying drawings, wherein similar constituent elements are designated by similar reference numerals.

FIG. 1 shows the configuration of a LCD device according to a first embodiment of the present invention. The LCD device includes a light-incident-side polarizing film 104, a LC cell 110, an optical anisotropic film 116 (referred to as second optical anisotropic film hereinafter), a biaxial optical anisotropic film 115 (sometimes referred to as first optical anisotropic film), and a light-emitting-side polarizing film 108. The structure of the LCD device of the present embodiment is such that the second optical anisotropic film 116 is added to the structure of the LCD device shown in FIG. 8.

The LC cell 110 includes a homogeneously-oriented LC layer, and a pair of transparent substrates (glass substrates) sandwiching therebetween the LC layer. One of the transparent substrates mounts thereon color filters, wherein each of an array of pixels includes at least R, G and B color filters. The LC material or LC molecules configuring the LC layer in the LC cell 110 has a positive relative permittivity. In an alternative, the LC material may have a negative relative permittivity. A backlight source (not shown) is provided on the rear side of the light-incident-side polarizing film 104. The LCD device uses the backlight source as a light source for display of image, and controls transmission or interception of light emitted from the backlight source by using the LC cell 110.

The light-incident-side polarizing film 104 and the light-emitting-side polarizing film 108 sandwich therebetween the LC cell 110. The light-incident-side polarizing film 104 includes a polarizer 101 and a pair of protective layers 102, 103 sandwiching therebetween the polarizer 101. The protective layer 103 of the light-incident-side polarizing film 104 near the LC cell 110 has an optical isotropy. The light-emitting-side polarizing film 108 includes a polarizer 105 and a pair of protective layers 106, 107 sandwiching therebetween the polarizer 105. The protective layer 107 of the light-emitting-side polarizing film 108 near the LC cell 110 has a thickness-wise retardation in the range between 90 nm and 20 nm inclusive of both.

The light absorption axis of polarizer 101 is perpendicular to the light absorption axis of polarizer 105. More specifically, polarizer 101 has a light absorption axis parallel to Y-axis direction whereas polarizer 105 has a light absorption axis parallel to X-axis direction. The initial orientation of the LC molecules in the LC cell 110 is parallel to the light absorption axis of polarizer 101 of the light-incident-side polarizing film 104.

The biaxial optical anisotropic film 115 and second optical anisotropic film 116 are arranged between the light-emitting-side polarizing film 108 and the LC cell 110 in this order, as viewed from the light-emitting-side polarizing film 108. The relationship between the three-dimensional refractive indexes of the biaxial optical anisotropic film 115 is expressed by $(ns-nz)/(ns-nf) \leq 0.5$, assuming that ns, nf and nz are the refractive index of the slow axis within a plane parallel to the surface of LC cell, fast axis within the plane parallel to the surface of LC cell, and the thickness direction of the LC cell, respectively. The second optical anisotropic film 116 has an optical axis substantially perpendicular to the surface of LC cell 110. The slow axis (ns) of the biaxial optical anisotropic film 115, the initial orientation of the LC cell (i.e., the orientation of the LC layer upon absence of the applied voltage), and light transmission axis of the light-emitting-side polarizing film 108 are parallel to one another. The above three-dimensional refractive indexes (ns, nf, nz) may be measured by an automatic birefringence analyzer (KOBRA from Oji-Keisoku corporation) using an ellipsometer or parallel Nicols, etc.

The in-plane retardation Re ($Re=(ns-nf) \times d$, d is the thickness) of the biaxial optical anisotropic film 115 with respect to a 550-nm-wavelength light is within the range of 80 nm+$\alpha \leq Re \leq 230$ nm+$\alpha$ assuming that $\alpha$ is the thickness-wise retardation Rth of the second optical anisotropic film 116 with respect to a 550-nm-wavelength light, wherein $Rth=\{((ns+nf)/2)-nz\} \times d$, given d representing the thickness of the second optical anisotropic film 116. The retardation Rth of the second optical anisotropic film 116 with respect to the red range of light, retardation Rth with respect to the green range of light and retardation Rth with respect to the blue range of light are represented in this text by those with respect to the substantially central wavelength of the respective wavelength ranges, and thus are expressed by Rth(650 nm), Rth(550 nm) and Rth(450 nm), respectively.

Those retardations in the present embodiment satisfy the following relationship:

Rth(450 nm)>Rth(550 nm)>Rth(650 nm).

In addition, the difference between the retardation Rth(450 nm) with respect to the blue range and the retardation Rth(650 nm) with respect to the red range is expressed by:

Rth(450 nm)−Rth(650 nm)$\leq$92 nm.

FIG. 1 exemplifies the LCD device wherein the biaxial optical anisotropic film 115 and second optical anisotropic film 116 are provided outside the LC cell 110. However, at least one of these layers may be included within the LC cell 110, because it is sufficient that these layers be disposed between the LC layer of the LC cell 110 and the light-emitting-side polarizing film 108. For example, the RGB color filters may have the thickness-wise retardations, and thus have the function of the second optical anisotropic film 116, and replaces the same. In this text, the term "second optical anisotropic film" includes such color filters.

It is assumed here that the LCD device of FIG. 1 is observed from the front side thereof and normal to the screen in the state where the LC layer in the LC cell 110 is applied with no voltage. In this state, the light transmission axis of the light-incident-side polarizing film 104, optical axis of the LC layer, optical axis of the second optical anisotropic film 116 that is substantially normal to the LC layer, and slow axis of the biaxial optical anisotropic film 115 are parallel or perpendicular to one another. Accordingly, the light passed by the light-incident-side polarizing film 104 reaches the light-emitting-side polarizing film 108 with the polarization of the light being unchanged. Due to the configuration wherein the light transmission axis of the light-incident-side polarizing film 104 is perpendicular to the light transmission axis of the light-emitting-side polarizing film 108, the light incident onto the light-emitting-side polarizing film 108 is absorbed by the light-emitting-side polarizing film 108. Thus, the LCD device assumes a dark state in the front view of the LCD device.

Figure 8:
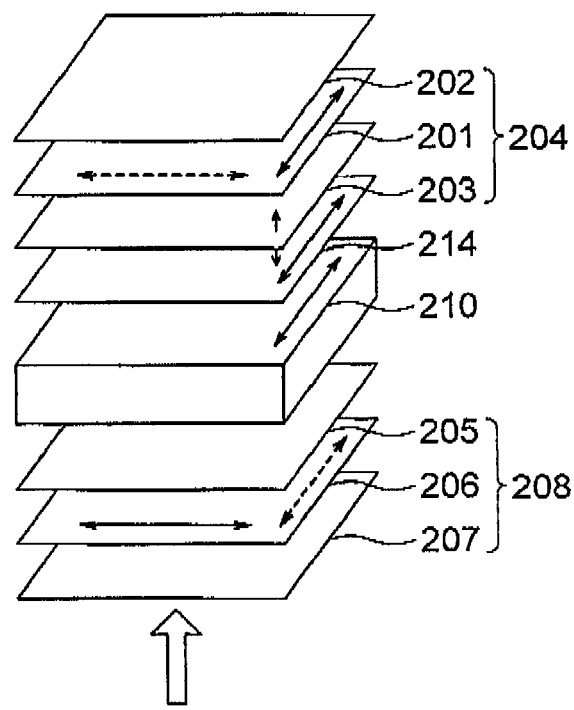
FIG. 8 is a perspective view showing the configuration of a LCD device of the related art.

If the LCD device is observed in a slanted viewing direction, the angle between the light transmission axis of the light-incident-side polarizing film 104 and the light transmission axis of the light-emitting-side polarizing film 108 deviates slightly from 90 degrees. This causes leakage of light in the slanted viewing direction. In the technique of Patent Publication-1, as shown in FIG. 8, the leakage light is suppressed in the manner as recited hereinafter. One of the protective layers near the LC cell, e.g., the protective layer 205 of the light-incident-side polarizing film 208 is allowed to have an optical isotropy. More specifically, the protective layer 205 having a negative uniaxial anisotropy and an optical axis perpendicular to the LC cell is replaced by another protective layer having an optical isotropy. This allows the light having a linear polarization to enter the LC layer as it is without a change of polarization.

Since the orientation of the LC layer is parallel to the light-incident surface of the LC layer, polarization of the incident light is not changed, and thus passes therethrough as it is, i.e., as a linearly-polarized light. This allows the light to pass through the layers as the linearly-polarized light, without being subjected to a coloring or wavelength dispersion. It is to be noted here that replacement of the protective layer having an optical isotropy by a uniaxial retardation film, which is relatively easy to acquire, will result in a similar advantage. This is because the polarization of light incident onto the LC layer is substantially unchanged as in the above case where the LC layer does not cause the change of polarization.

Next, a case will be described wherein the three-dimensional refractive indexes of the biaxial optical anisotropic film (optical compensation film) 214 in the related art satisfy the relationship of $(ns-nz)/(ns-nf) \leq 0.5$. In this case, the combination of the optical compensation film 214 and protective layer 203 of the light-emitting-side polarizing film 204 configures an equivalent $\lambda/2$ wavelength film having an optical axis in the direction between the linearly-polarized light passed by the LC cell 210 and the light absorption axis of the light-emitting-side polarizing film 204 as viewed in the slanted direction. In this combination structure, the polarization of linearly-polarized light passed by the LC cell 210 in the slanted direction is changed to be perpendicular to the light transmission axis of the light-emitting-side polarizing film 204, to thereby suppress the leakage of light in the slanted viewing direction.

Figure 2:
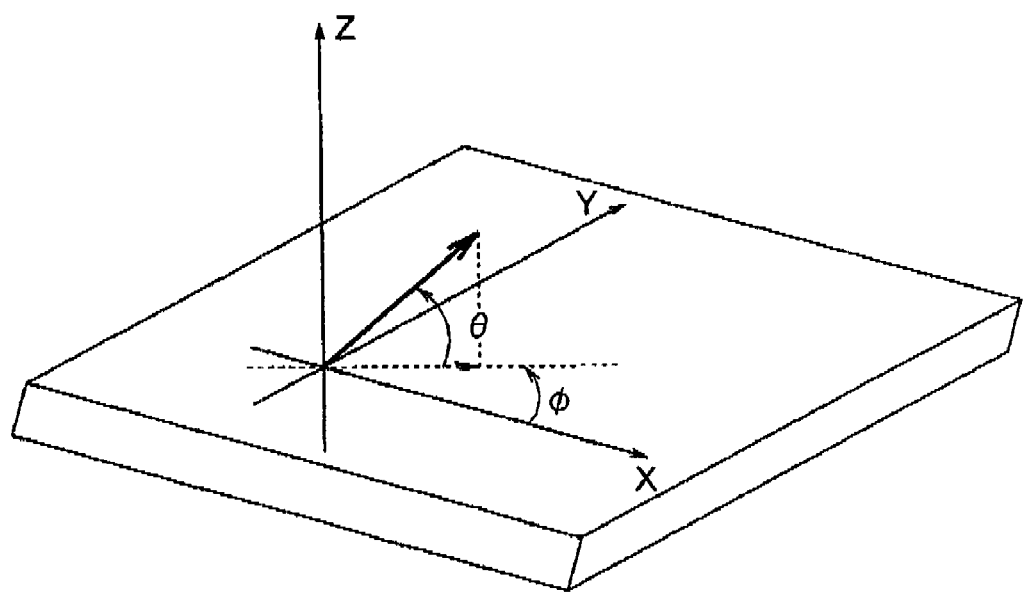
FIG. 2 is a perspective view showing the definition of the azimuth angle and polar angle in the LCD device.

FIG. 2 shows the definition of azimuth angle and polar angle in this text. X-axis shown FIG. 2 is assumed to be parallel to the optical axis of a polarizing film, and thus the definition of the azimuth angle is such that the azimuth angle $\phi$ of the optical axis of this polarizing film is zero degree. An angle $\theta$ is defined by a rotational angle obtained by rotation from the X-Y plane toward the Z-axis direction, whereby the polar angle is defined by an angle of $(90°-\theta)$.

Figure 3:
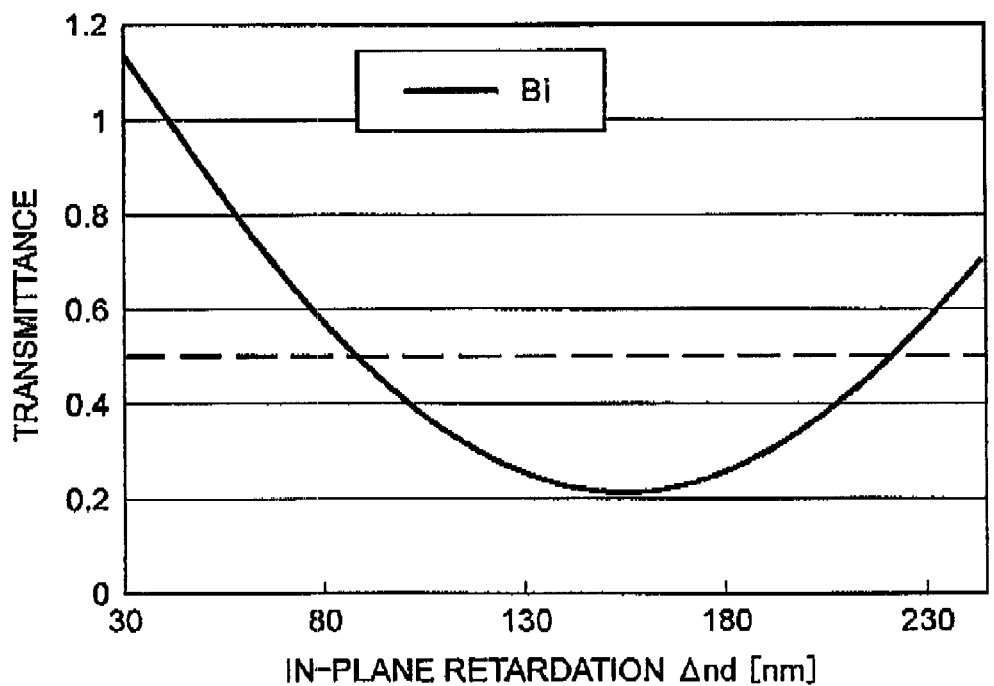
FIG. 3 is a graph showing the relationship between the in-plane retardation and the normalized transmittance (transmission factor) of the LCD device.

FIG. 3 shows the relationship between the in-plane retardation Δnd (Re) of the optical compensation layer 214 and the transmission factor (transmittance) of the light measured in the direction at an azimuth angle of 45 degrees and a polar angle of 45 degrees (θ=45°) in the related art shown in FIG. 8. The transmission factor shown in FIG. 3 is normalized by a black brightness which means the brightness at the azimuth angle of 45 degrees and polar angle of 45 degrees upon display of a dark state in the case that no optical compensation layer 214 is, provided therein. In FIG. 3, the solid line represents the normalized transmittance achieved by the biaxial optical anisotropic film (Bi) 115 having the in-plane retardation plotted on the abscissa, and the dotted line represents the desired level of the transmission factor achieved by provision of the biaxial optical anisotropic film 115. In FIG. 3, the satisfactorily suppressed range of black brightness (desired transmittance level) is set at 0.5, which means that a black brightness is suppressed by the optical compensation layer down to 50% of the original black brightness, i.e., in the case of without using the optical compensation layer 214. The graph of FIG. 3 reveals the range of in-plane retardation Δnd (Re) of the biaxial optical anisotropic film 115 in the present embodiment that suppresses the black brightness down to a desired level of 50%. The retardation Re of the biaxial optical anisotropic film 115 obtained from FIG. 3 is in the range of 80 nm≦Re≦230 nm.

As described above with reference to the related art, the leakage of light can be suppressed satisfactorily by using a biaxial optical anisotropic film 115 having a retardation of 80 nm≦Re≦230 nm in the present embodiment. However, since the compensation of retardation achieved by the combination of the biaxial optical anisotropic film 115 and protective layer 107 of the polarizing film 108 is a change of polarization substantially in a single direction, the wavelength dependency of the birefringence of the biaxial optical anisotropic film 115 causes a coloring or chromaticity shift. In view of this fact, the wavelength dependency of the birefringence of the biaxial optical anisotropic film 115 in the present embodiment is cancelled by the additional second optical anisotropic film 116 having an optical axis perpendicular to the surface of LC cell 110.

More specifically, the second optical anisotropic film 116 changes the polarization of light in the direction opposite to the change of polarization caused by the biaxial optical anisotropic film 115. This allows the overall function of the second optical anisotropic film 116, biaxial optical anisotropic film 115 and protective layer 107 of the light-emitting-side polarizing film 108 to have a uniform retardation in wider wavelength range.

Assuming that Re(550 nm) and Rth(550 nm)=α are the in-plane retardation of the biaxial optical anisotropic film 115 with respect to a 550-nm-wavelength light within the green range, and the thickness-wise retardation of the second optical anisotropic film 116 with respect to the 550-nm-wavelength light, respectively, addition of the second optical anisotropic film 116 means that the overall retardation of these two layers can be expressed by Re(550 nm)-α. Therefore, in order for setting the overall retardation of these two layers with respect to a 550-nm-wavelength light within the range of 80 nm to 230 nm, which satisfactorily suppresses the leakage of light, it is sufficient that the in-plane retardation of the biaxial optical anisotropic film 115 with respect to a 550-nm-wavelength light be shifted by α, to assume a range of 80 nm+α≦Re≦230 nm+α. This range of retardation effectively suppresses the leakage light.

Figure 4:
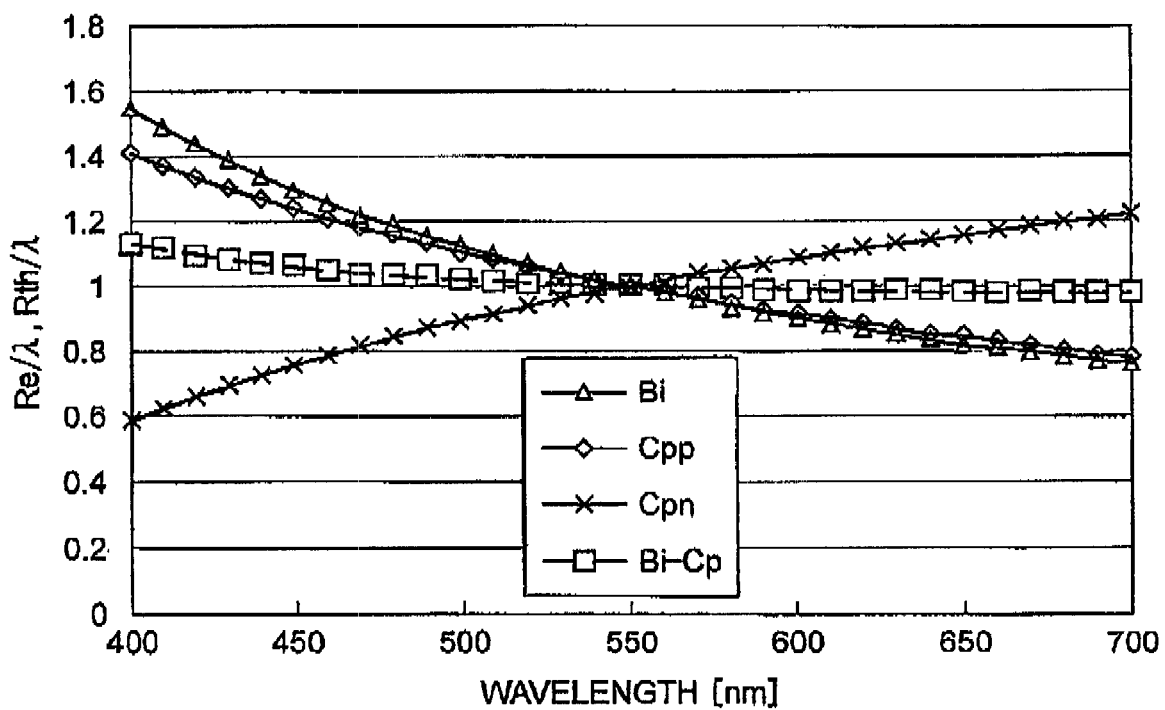
FIG. 4 is a graph showing wavelength dependency of the in-plane retardation of the biaxial optical anisotropic film 115 and the thickness-wise retardation of the second optical anisotropic film 116.

FIG. 4 shows the wavelength dependency of the in-plane retardation of the biaxial optical anisotropic film 115, and the thickness-wise retardation of the second optical anisotropic film 116. In FIG. 4, the curves plotted by triangle dots, parallelogram dots, cross dots and square dots correspond to the biaxial optical anisotropic film (Bi) 115, second optical anisotropic film (Cpp) having a positive retardation, second optical anisotropic film (Cpn) having a negative retardation, and combination layers (Bi-Cp) including the biaxial optical anisotropic film and second optical anisotropic film, respectively. In FIG. 4, the in-plane retardation Re of the biaxial optical anisotropic film 115, and the thickness-wise retardation Rth of the second optical anisotropic film 116 are shown after dividing the same by the corresponding wavelength λ and normalizing the resultant value by the value obtained from a 550-nm-wavelength light. In order for allowing the overall retardation of the second optical anisotropic film 116, biaxial optical anisotropic film 115 and protective layer 107 to have a wider effective wavelength range, it is sufficient that the second optical anisotropic film 116 have a range of optical characteristic that can cancel the wavelength dependency of the birefringence caused by the biaxial optical anisotropic film 115.

In order to obtain the conditions for the combination layers to have a wider effective wavelength range, a simulation is conducted for the case where the thickness-wise retardation Rth of the second optical anisotropic film 116 is selected as a parameter. Table 1 shows the conditions for the simulation, whereas Tables 2 to 4 show the results of the simulation. In this simulation, it is considered that coloring is generated due to the wavelength dependency of the biaxial optical anisotropic film 115, i.e., due to the difference in the retardation thereof between the blue range and green range of light and between the red range and the green range of light, with the retardation with respect to the green range of light being as a reference. Thus, the retardation Rth(550 nm) with respect to a 550-nm-wavelength light of the green range is fixed at 0 nm as a reference retardation, and the retardation Rth(450 nm) with respect to a 450-nm-wavelength light of the blue range and the retardation Rth(650 nm) with respect to a 650-nm-wavelength light of the red range are selected as the parameters for the calculation.

For showing the results of simulation, Stokes parameters (s1, s2, s3) representing the state of polarization are used herein. The optical conditions of the second optical anisotropic film 116 are derived from the range of Stokes parameters of the red range and blue range approaching toward the Stokes parameters of the green range, i.e., the range where the Stokes parameters of the red range and blue range are substantially equal to the Stokes parameters of the green range, or the distance R between the Stokes parameters of the read range and blue range and the Stokes parameters of the green range is small.

Table 1: Conditions Employed in the Simulation

TABLE 1

|  |  | RED RANGE 650 nm | GREEN RANGE 550 nm | BLUE RANGE 450 nm | DIRECTION (°) |
|---|---|---|---|---|---|
| POLARIZER 101 | ABSORPTION AXIS | — | — | — | 0 |
| PROTECTIVE LAYER | Rth (nm) | — | 50 | — | — |
|  | Re (nm) | — | 0 | — | — |

TABLE 1-continued

|  |  | RED RANGE 650 nm | GREEN RANGE 550 nm | BLUE RANGE 450 nm | DIRECTION (°) |
|---|---|---|---|---|---|
| BIAXIAL ANIS. LAYER (Bi) | Nz COEFFICIENT | — | 0.25 | — | — |
|  | Re (nm) | — | 175 | — | — |
|  | SLOW AXIS | — | — | — | 90 |
| SECOND ANIS. LAYER (Cp) | Rth (nm) | −50~0 | 0 | 0~50 | — |
|  | Re (nm) | 0 | 0 | 0 | — |
| LC LAYER | Re (nm) | — | 300 | — | — |
|  | OPTICAL AXIS | — | — | — | 90 |
| PROTECTIVE LAYER | Rth (nm) | 0 | 0 | 0 | — |
|  | Re (nm) | 0 | 0 | 0 | — |
| POLARIZER 105 | ABSORPTION AXIS | — | — | — | 90 |

Table 2: Results of Simulation Showing the Stokes Parameters without the Second Optical Anisotropic Film

TABLE 2

| WAVELENGTH | s1 | s2 | s3 |
|---|---|---|---|
| 450 | −0.044641 | 0.006024 | 0.067415 |
| 550 | 0 | 0 | 0 |
| 650 | 0.055859 | −0.002331 | −0.033631 |

Table 3: Results of Simulation Showing the Stokes Parameter of the Red Range

TABLE 3

| Rth(nm) | s1 | s2 | s3 | DISTANCE R |
|---|---|---|---|---|
| −51.7 | −0.0632 | 0.0086 | −0.0221 | 0.0675 |
| −48.0 | −0.0547 | 0.0073 | −0.0228 | 0.0598 |
| −44.3 | −0.0463 | 0.0062 | −0.0236 | 0.0523 |
| −40.6 | −0.0378 | 0.0050 | −0.0244 | 0.0453 |
| −36.9 | −0.0293 | 0.0040 | −0.0252 | 0.0388 |
| −33.2 | −0.0208 | 0.0030 | −0.0260 | 0.0334 |
| −29.5 | −0.0123 | 0.0021 | −0.0268 | 0.0296 |
| −25.8 | −0.0038 | 0.0013 | −0.0276 | 0.0279 |
| −22.1 | 0.0048 | 0.0006 | −0.0285 | 0.0289 |
| −18.5 | 0.0133 | −0.0001 | −0.0293 | 0.0322 |
| −14.8 | 0.0218 | −0.0007 | −0.0301 | 0.0372 |
| −11.1 | 0.0303 | −0.0012 | −0.0310 | 0.0434 |
| −7.4 | 0.0388 | −0.0017 | −0.0318 | 0.0502 |
| −3.7 | 0.0474 | −0.0020 | −0.0327 | 0.0576 |
| 0.0 | 0.0559 | −0.0023 | −0.0336 | 0.0652 |

Table 4: Results of Simulation Showing the Stokes Parameters of the Blue Range

TABLE 4

| Rth(nm) | s1 | s2 | s3 | DISTANCE R |
|---|---|---|---|---|
| 0.0 | −0.0446 | 0.0060 | 0.0674 | 0.0811 |
| 2.5 | −0.0389 | 0.0049 | 0.0600 | 0.0716 |
| 5.0 | −0.0329 | 0.0039 | 0.0526 | 0.0622 |
| 7.5 | −0.0269 | 0.0029 | 0.0453 | 0.0528 |
| 10.1 | −0.0209 | 0.0021 | 0.0380 | 0.0435 |
| 12.6 | −0.0149 | 0.0013 | 0.0308 | 0.0342 |
| 15.1 | −0.0088 | 0.0006 | 0.0236 | 0.0251 |
| 17.6 | −0.0026 | 0.0000 | 0.0164 | 0.0166 |
| 20.1 | 0.0036 | −0.0005 | 0.0092 | 0.0099 |
| 22.6 | 0.0098 | −0.0009 | 0.0021 | 0.0101 |
| 25.1 | 0.0161 | −0.0012 | −0.0050 | 0.0169 |
| 27.6 | 0.0224 | −0.0015 | −0.0121 | 0.0255 |
| 30.2 | 0.0287 | −0.0017 | −0.0191 | 0.0345 |
| 32.7 | 0.0351 | −0.0017 | −0.0261 | 0.0438 |
| 35.2 | 0.0415 | −0.0017 | −0.0331 | 0.0531 |
| 37.7 | 0.0480 | −0.0016 | −0.0400 | 0.0625 |
| 40.2 | 0.0544 | −0.0015 | −0.0469 | 0.0718 |
| 42.7 | 0.0610 | −0.0012 | −0.0537 | 0.0812 |
| 45.2 | 0.0675 | −0.0009 | −0.0605 | 0.0907 |
| 47.7 | 0.0741 | −0.0004 | −0.0673 | 0.1001 |
| 50.3 | 0.0807 | 0.0001 | −0.0740 | 0.1095 |

Table 2 shows the results of simulation without using the second optical anisotropic film 116, i.e., in the LCD device of the related art. Here, the Stokes parameters of the green range (550 nm) are used as a reference and defined so that (s1, s2, s3)=(0, 0, 0). Table 3 shows the results of simulation showing the retardation Rth(650 nm) of the red range. If the retardation Rth(650 nm) with respect to a 650-nm-wavelength light is changed from zero to a negative side in the red range, the distance R between the Stokes parameters of the read range and the Stokes parameters (s1, s2, s3)=(0, 0, 0) of the green range assumes a minimum at a retardation of −26 nm, and then increases up to the distance equivalent to the distance at zero at a retardation of about −50 nm. It is understood from this fact that coloring toward a red color is suppressed by setting the thickness-wise retardation Rth(650 nm) for the red range within a range of −50 nm≦Rth(650 nm)<0 nm.

Table 4 shows the results of simulation for the retardation Rth(450 nm) in the blue range. If the retardation Rth(450 nm) with respect to a 450-nm-wavelength light is changed from zero to a positive side in the blue range, the distance R assumes a minimum at a retardation of about 20 nm, and then increases up to the distance equivalent to the zero distance at a retardation of about 42 nm. It is understood from this fact that coloring toward a blue color is suppressed by setting the thickness-wise retardation Rth(450 nm) for the blue range within a range of 0 nm<Rth(450 nm)≦42 nm.

From the above results of simulation, the conditions for suppressing the coloring can be obtained. The obtained conditions are such that if the thickness-wise retardation Rth(550 nm) of the second optical anisotropic film 116 with respect to a 550-nm-wavelength light in the green range is about zero, the retardation Rth(450 nm) of the second optical anisotropic film 116 with respect to a 450-nm-wavelength light in the blue range is set to Rth(450 nm)>0, whereas the retardation Rth(650 nm) of the second optical anisotropic film 116 with respect to a 650-nm-wavelength light in the red range is set to Rth(650 nm)<0, for suppressing the coloring. This configuration corresponds to the relationship of the three-dimensional refractive indexes wherein (ns−nz)/(ns−nf)≧1 satisfies in the blue range and (ns−nz)/(ns−nf)≦−1 satisfies in the read range.

The obtained conditions also include a configuration of the LCD device wherein the biaxial optical anisotropic film 115 has an in-plane retardation Re(550 nm) with respect to a 550-nm-wavelength light in a range of 80 nm−α≦Re(550 nm)≦230 nm−α, and the second optical anisotropic film 116 has a thickness-wise retardation Rth(650 nm) with respect to a 650-nm-wavelength light in a range of 0 nm+α≦Rth(650 nm)≦50 nm+α and a thickness-wise retardation Rth(450 nm) with respect to a 450-nm-wavelength light in a range of −42 nm+α<Rth(450 nm)≦0 nm+α, given α representing a thickness-wise retardation Rth(550 nm) of the second optical anisotropic film 116 with respect to a 550-nm-wavelength light.

It is preferable in each case that the second optical anisotropic film 116 have an optical isotropy with respect to a light having a wavelength in the range of 550±20 nm.

It is sufficient that the difference between the thickness-wise retardation Rth(450 nm) with respect to a 450-nm-wavelength light in the blue range and the thickness-wise retardation Rth(650 nm) with respect to a 650-nm-wavelength light in the red range be equal to larger than 92 nm, i.e., Rth(450 nm)−Rth(650 nm)≦92 nm. More specifically, the thickness-wise retardation Rth(450 nm) of the second optical anisotropic film 116 with respect to a 450-nm-wavelength light in the blue range is set in a range of:

0 nm<Rth(450 nm)≦42 nm;

and the thickness-wise retardation Rth(650 nm) of the second optical anisotropic film 116 with respect to a 650-nm-wavelength light in the red range is set in a range of:

−50 nm≦Rth(650 nm)<0 nm.

This range of retardations provides suppression of coloring or chromaticity shift of the light.

In the above simulation, the retardation Rth(550 nm) of the second optical anisotropic film 116 with respect to a 550-nm-wavelength light in the green range is assumed at Rth(550 nm)≈0 nm. It is sufficient that the configuration of Rth(550 nm)≈0 nm be accompanied by a configuration wherein the in-plane retardation Re(550 nm) of the biaxial optical anisotropic film 115 with respect to a 550-nm-wavelength light is in a range of 80 nm≦Re≦230 nm, similarly to the related art. In this configuration, it is sufficient that the biaxial optical anisotropic film 115 have an optical characteristic similar to that in the related art. In other words, an anisotropic film having a new characteristic need no be provided, and the retardation of the second optical anisotropic film 116 with respect to a light having each wavelength is set to the above retardation, corresponding to each of the RGB areas of a pixel, to obtain a wider effective wavelength range, i.e., a substantially uniform retardation for the combination layers in a wider wavelength range.

If the retardation Rth(550 nm) of the second optical anisotropic film 116 in the green range is set at Rth(550 nm)≠0, the thickness-wise retardations Rth(450 nm) and Rth(650 nm) are respectively shifted by α, i.e., by the thickness-wise retardation Rth(550 nm) in the green range. In this case, the relationship between the thickness-wise retardations Rth with respect to light having respective wavelength ranges is as follows:

Rth(450 nm)>Rth(550 nm)>Rth(650 nm).

The thickness-wise retardation Rth(650 nm) of the second optical anisotropic film 116 in the red range is shifted by α from the above range, to thereby assume a range of:

−50 nm+α≦Rth(650 nm)<α

Similarly, the thickness-wise retardation Rth(450 nm) of the second optical anisotropic film 116 in the blue range is obtained as follows:

α<Rth(450 nm)≦42 nm+α

The results of above calculation are premised on the condition that the ratio of retardation of the biaxial optical anisotropic film 115 with respect to a 450-nm-wavelength light to retardation of the second optical anisotropic film with respect to a 550-nm-wavelength light is a typical value of 1.2. If this ratio has a different value, the range of optical characteristic of the second optical anisotropic film 116 is also changed. In such a case, the range of thickness-wise retardation Rth of the second optical anisotropic film 116 having a wider effective wavelength range can be calculated similarly to the procedure as described above.

Figure 5:
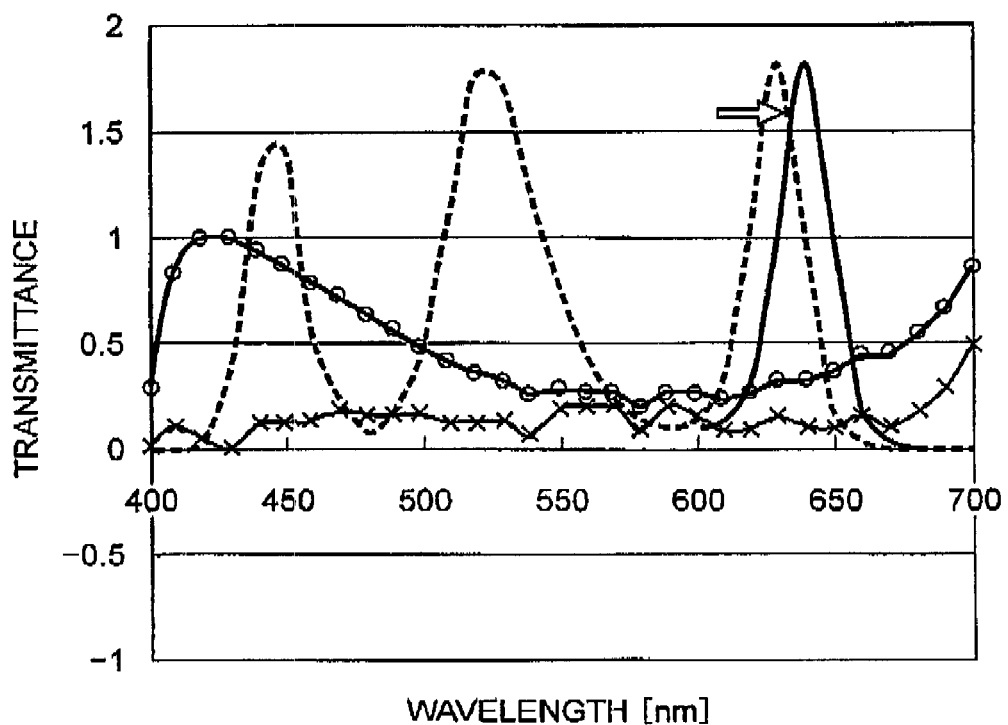
FIG. 5 is a graph showing the wavelength dependency of the transmittance in the related art.

FIG. 5 shows the relationship between the spectrum of the transmitted light and the spectrum of the backlight in the front view and a slanted view of the LCD device having the structure of FIG. 8. In FIG. 5, the solid line plotted by circular dots, solid line plotted by cross dots and dotted line correspond to a slanted view, a front view and backlight spectrum, respectively. The transmission factor is normalized by the maximum transmission factor observed in the slanted view. The slanted view is selected such that the azimuth angle thereof is obtained by shifting the light absorption axis of the polarizer by 45 degrees, and the polar angle thereof is equal to 90°−θ=45°. In the front view, a coloring is not generated because the spectrum of transmitted light has substantially no difference in the strength at the peak of the backlight spectrum. On the other hand, in the slanted view, the spectrum of the transmitted light has a larger difference in the strength between the blue range and the red range, causing generation of a coloring. In addition, if the peak in the red range of the backlight spectrum is deviated toward the longer wavelength side as shown by an arrow and a corresponding solid curve in FIG. 5, the transmission factor of the red color in the slanted view is increased to intensify the red color, whereby the display color of an image is shifted toward a red color.

Figure 6:
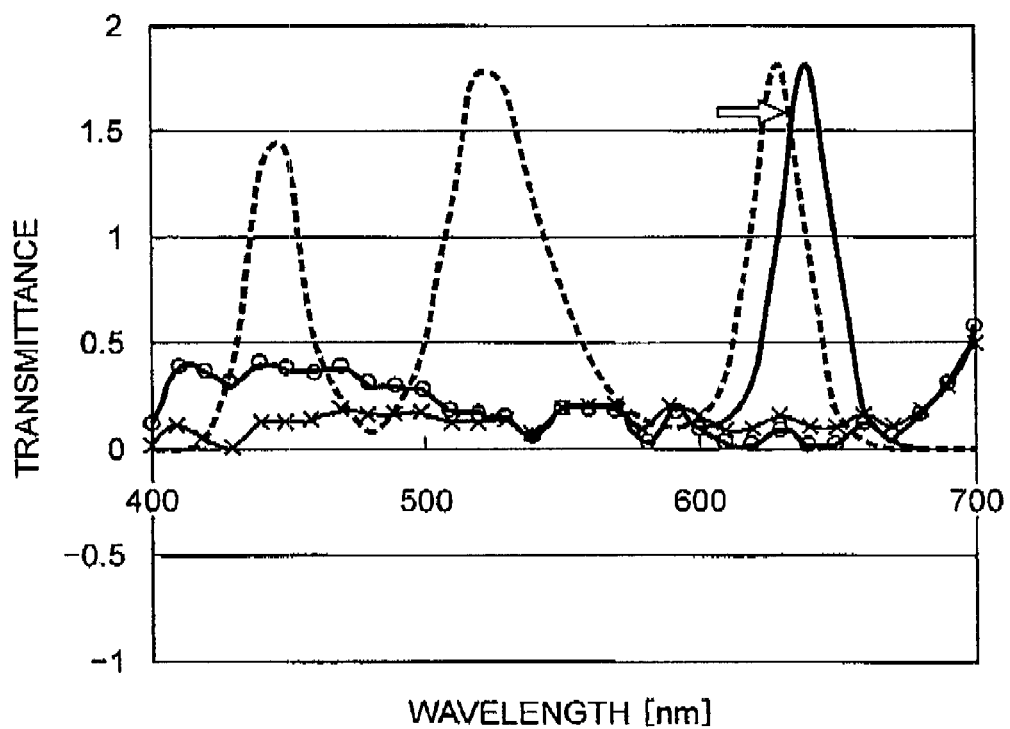
FIG. 6 is a graph showing the wavelength dependency of the transmittance in the first embodiment.

FIG. 6 shows the relationship between the spectrum of the transmitted light and the spectrum of the backlight in the front view and a slanted view of the LCD device of the present embodiment, after normalizing the same by using the maximum transmission factor used for FIG. 5. In FIG. 6, the solid line plotted by circular dots, solid line plotted by cross dots and dotted line correspond to a slanted view in the present embodiment, the slanted view in the related art (same as that in FIG. 5) and backlight spectrum, respectively. Comparing FIG. 6 against FIG. 5, it will be understood that the configuration of the present embodiment reduces the difference between the transmission factors for the red, green and blue colors in the slanted view. In addition, since the change of transmission factor with respect to the change of wavelength of the transmitted light in the slanted view is smaller, the transmission factor of the red color in the slanted view is scarcely changed even if the red range of the backlight spectrum is shifted toward a longer wavelength range as shown by an arrow and a corresponding solid line, whereby the coloring or chromaticity shift does not occur. Thus, in the present embodiment, the difference in the color between in the slanted view and in the front view is smaller, whereby an optical compensation is possible without depending on the spectrum of backlight.

In the present embodiment, the second optical anisotropic film 116 having an optical axis perpendicular to the surface of LC cell 110 is provided on the side of the biaxial optical anisotropic film 115 near the LC cell 10. The provision of the second optical anisotropic film 116 compensates the wavelength dispersion caused by the biaxial optical anisotropic film 115, to thereby suppress a coloring in the slanted view. In a concrete configuration, the thickness-wise retardations of the second optical anisotropic film 116 with respect to lights having different wavelengths are set to have the following relationship:

$$Rth(650\ nm) > Rth(550\ nm) > Rth(450\ nm).$$

This arrangement of the retardations reduces the wavelength dependency of the retardation caused by combination of the biaxial optical anisotropic film 115 and the second optical anisotropic film 116, thereby suppressing the coloring. Thus, the LCD device of the present embodiment achieves a wider viewing angle characteristic, and is suited to a variety of applications such as desktop monitor or television set that requires a wider viewing angle characteristic.

Figure 7:
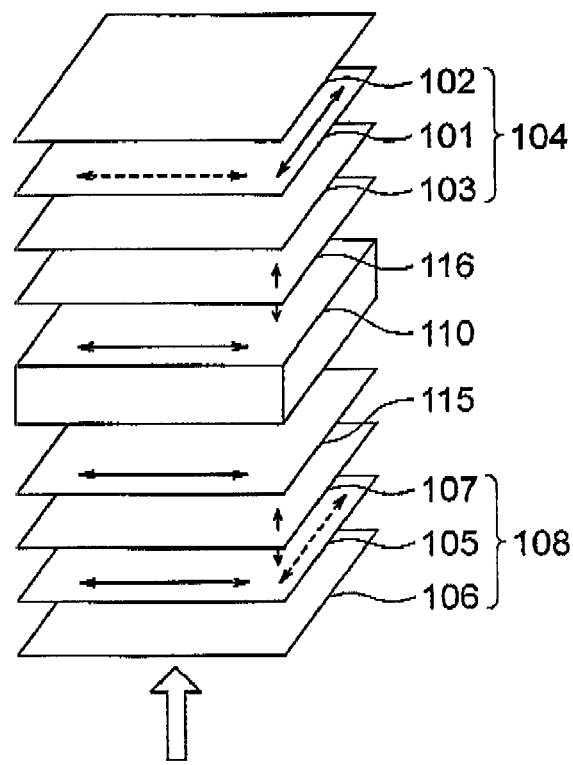
FIG. 7 is a perspective view showing the configuration of a LCD device according to a second embodiment of the present invention.

FIG. 7 shows a LCD device according to a second embodiment of the present invention. The configuration of the LCD device of the present embodiment is such that the constituent elements on the light emitting side and constituent elements on the light incident side are exchanged therebetween, and the second optical anisotropic film 116 is interposed between the LC cell 110 and the light-emitting-side polarizing film 104. In the present embodiment, the biaxial optical anisotropic film 115 is interposed between the light-incident-side polarizing film 108 and the LC cell 110. The protective layer 107 of the light-incident-side polarizing film 108 near the LC cell 110 has an in-plane retardation of substantially zero, and a thickness-wise retardation of 20 nm to 90 nm.

The relationship between the three-dimensional refractive indexes of the biaxial optical anisotropic film 115 is $(ns-nz)/(ns-nf) \leq 0.5$ where ns, nf and nz are the refractive indexes in the direction of the in-plane slow axis, direction of the in-plane fast axis and thickness-wise direction, respectively. The slow axis (ns) of the biaxial optical anisotropic film 115, initial orientation of the LC layer (upon absence of the applied voltage) and light transmission axis of the light-incident-side polarizing film 108 are arranged to be parallel to one another. The in-plane retardation Re of the biaxial optical anisotropic film 115 with respect to a 550-nm-wavelength light is within a range of 80 nm$-\alpha \leq Re \leq 230$ nm$-\alpha$, given a being the thickness-wise retardation Rth(550 nm) of the second optical anisotropic film 116 with respect to a 550-nm-wavelength light in the green range.

A second optical anisotropic film 116 is interposed between the light-emitting-side polarizing film 104 and the LC cell 110 in the present embodiment. The protective layer 103 of the light-emitting-side polarizing film 104 near the LC cell 110 has an isotropic optical characteristic. The protective layer 103 of the light-emitting-side polarizing film 104 may be omitted in the present embodiment. The second optical anisotropic film 116 has an optical axis substantially perpendicular to the surface of LC cell 110. The retardations Rth of the second optical anisotropic film 116 with respect to 650-nm-wavelength (Red) light, 550-nm-wavelength (Green) light, and 450-nm-wavelength (Blue) light satisfy the relationship of Rth(450 nm)<Rth(550 nm)<Rth(650 nm). The difference between the retardation Rth(650 nm) in the red range and retardation Rth(450 nm) in the blue range is equal to 92 nm or smaller, i.e., Rth(650 nm)−Rth(450 nm)$\leq$92 nm, similarly to the first embodiment.

If the retardation Rth(550 nm) of the second optical anisotropic film 116 in the green range is substantially zero, i.e., the second optical anisotropic film 116 has an optical isotropic characteristic in this range, the retardation Rth(450 nm) in the blue range satisfies Rth(450 nm)<0, and the retardation Rth (650 nm) in the red range satisfies Rth(650 nm)>0. In this case, the relationship 0 nm<Rth(650 nm)$\leq$50 nm and the relationship−42 nm$\leq$Rth(450 nm)<0 nm hold. The three-dimensional refractive indexes of the second optical anisotropic film may preferably satisfy:

$(ns-nz)/(ns-nf) \leq -1$ with respect to a 450-nm-wavelength light; and $(ns-nz)/(ns-nf) \geq 1$ with respect to a 650-nm-wavelength light.

The biaxial optical anisotropic film 115, as observed in a slanted viewing direction, functions as a $\lambda/2$ wavelength film having an optical axis between the light transmission axis of polarizer 105 of the light-incident-side polarizing film 108 and the light absorption axis of polarizer 101 of the light-emitting-side polarizing film 104. A linearly-polarized light that passes through the light-incident-side polarizer 105 then passes the biaxial optical anisotropic film 115 to have a changed polarization, which is parallel to the light absorption axis of the light-emitting-side polarizer 101. If the polarized direction of all the light is uniform, the polarized direction of the linearly-polarized light is not changed because the orientation of the LC layer is parallel to the light incident plane of the LC layer. However, to be exact, only the light having a wavelength of around 550 nm has a polarized direction coinciding with the light absorption axis of the light-emitting-side polarizer 101, and the light having a wavelength of 450 nm or 650 nm has a different polarized state, i.e., an elliptically-polarized state, due to the wavelength dependency of the birefringence of the polarizer 101 and biaxial optical anisotropic film 115.

The light having a wavelength of 450 nm or 650 nm, which enters the LC layer in such a polarized state, is changed in the polarized state after passing through the LC layer having a retardation of 250 nm to 450 nm (in the front view) equivalent to that of a $\lambda/2$ wavelength film, to assume an elliptically-polarized light. The resultant elliptically-polarized light has a rotational direction of polarization opposite to the rotational direction of polarization of the light incident onto the LC layer. Thus, the second optical anisotropic film 116 is interposed between the light-emitting-side polarizing film 104 and the LC cell 110 in the second embodiment, the second optical anisotropic film having a retardation of a sign opposite to the sign of the retardation of the second optical anisotropic film 116 provided in the first embodiment. The second optical anisotropic film 116 in the present embodiment cancels the wavelength dependency of the birefringence occurring in the protective layer 107, biaxial optical anisotropic film 115 and LC cell 110, to provide a linearly-polarized light having a uniform polarized direction parallel to the light absorption axis of the light-emitting-side polarizer 101, thereby suppressing coloring of the emitted light.

In the basic configuration of the above first embodiment, the liquid crystal display (LCD) device includes: a liquid crystal (LC) cell including a homogeneously-oriented LC layer and a pair of transparent substrates sandwiching therebetween the LC layer; a first polarizing film disposed on a light incident side of the LC cell, the first polarizing film including a first polarizer and a pair of first protective layers sandwiching therebetween the polarizer, one of the first protective layers interposed between the first polarizer and the LC cell having an optical isotropy; a second polarizing film disposed on a light emitting side of the LC cell, the second polarizing film including a second polarizer and a pair of second protective layers sandwiching therebetween the second polarizer, one of the second protective layers interposed between the second polarizer and the LC cell having an in-plane retardation of substantially zero and a thickness-wise retardation of 20 nm to 90 nm: first and second optical anisotropic films interposed between the LC layer sand the second polarizing film and consecutively disposed from the second polarizing film, the first optical anisotropic film having a biaxial optical anisotropy and refractive indexes of ns, nf and nz in a direction of an in-plane slow axis, in a direction of an in-plane fast axis, and a thickness direction, respectively, the refractive indexes satisfying the relationship of $(ns-nz)/(ns-nf) \leq 0.5$, the second optical anisotropic film having an optical axis substantially perpendicular to a surface of the LC cell, wherein: the first polarizer has a light absorption axis perpendicular to a light absorption axis of the second polarizer; and the in-plane slow axis of the first optical anisotropic film, an orientation of the LC layer upon absence of an applied voltage and a light transmission axis of the second polarizer are parallel to one another.

In the basic configuration of the above second embodiment, the liquid crystal display (LCD) device includes: a liquid crystal cell including a homogeneously-oriented liquid crystal layer and a pair of transparent substrates sandwiching therebetween the liquid crystal layer; a first polarizing film disposed on a light incident side of the liquid crystal cell and including a first polarizer, the first polarizing film further including a pair of first protective layers sandwiching therebetween the polarizer, one of the first protective layers interposed between the polarizer and the liquid crystal cell having an optical isotropy, or the first polarizing film further including a first protective layer disposed further than the polarizer as viewed from the liquid crystal cell; a second polarizing film disposed on a light emitting side of the liquid crystal cell, the second polarizing film including a second polarizer and a pair of second protective layers sandwiching therebetween the second polarizer, one of the second protective layers interposed between second polarizer and the liquid crystal cell having an in-plane retardation of substantially zero and a thickness-wise retardation of 20 nm to 90 nm: a first optical anisotropic film interposed between the liquid crystal layer and the second polarizing film, the first optical anisotropic film having an biaxial optical anisotropy and refractive indexes of ns, nf and nz in a direction of an in-plane slow axis, in a direction of an in-plane fast axis, and a thickness direction, respectively, the refractive indexes satisfying the relationship of $(ns-nz)/(ns-nf) \leq 0.5$; a second optical anisotropic film having an optical axis substantially perpendicular to a surface of the liquid crystal cell, wherein: the first polarizer has a light absorption axis perpendicular to a light absorption axis of the second polarizer; and the in-plane slow axis of the first optical anisotropic film, an orientation of the liquid crystal layer upon absence of an applied voltage and a light transmission axis of the second polarizer are parallel to one another.

In both the above basic configurations, the present invention achieves the advantage as recited below. The second optical anisotropic film having an optical axis perpendicular to the surface of the LC cell cancels the wavelength dependency of the retardation caused by the first optical anisotropic film (biaxial optical anisotropic film) which suppresses the leakage of light occurring in the slanted viewing direction, to thereby suppress the wavelength dispersion characteristic in the slanted viewing direction. More specifically, it is sufficient that the above embodiments have the above basic structures to achieve the advantage of the present invention.

While the invention has been particularly shown and described with reference to exemplary embodiment and modifications thereof the invention is not limited to these embodiment and modifications. It will be understood by those of ordinary skill in the art that various changes in form and details may be made therein without departing from the spirit and scope of the present invention as defined in the claims.

What is claimed is:

1. A liquid crystal display (LCD) device comprising:
a liquid crystal (LC) cell including a homogeneously-oriented LC layer and a pair of transparent substrates sandwiching therebetween the LC layer;
a first polarizing film disposed on a light incident side of said LC cell, said first polarizing film including a first polarizer and a pair of first protective layers sandwiching therebetween said polarizer, one of said first protective layers interposed between said first polarizer and said LC cell having an optical isotropy;
a second polarizing film disposed on a light emitting side of said LC cell, said second polarizing film including a second polarizer and a pair of second protective layers sandwiching therebetween said second polarizer, one of said second protective layers interposed between said second polarizer and said LC cell having an in-plane retardation of substantially zero and a thickness-wise retardation of 20 nm to 90 nm:
first and second optical anisotropic films interposed between said LC layer sand said second polarizing film and consecutively disposed from said second polarizing film, said first optical anisotropic film having a biaxial optical anisotropy and refractive indexes of ns, nf and nz in a direction of an in-plane slow axis, in a direction of an in-plane fast axis, and a thickness direction, respectively, said refractive indexes satisfying the relationship of $(ns-nz)/(ns-nf) \leq 0.5$, said second optical anisotropic film having an optical axis substantially perpendicular to a surface of said LC cell, wherein:
said first polarizer has a light absorption axis perpendicular to a light absorption axis of said second polarizer; and
said in-plane slow axis of said first optical anisotropic film, an orientation of said LC layer upon absence of an applied voltage and a light transmission axis of said second polarizer are parallel to one another.

2. The LCD device according to claim 1, wherein said second optical anisotropic film has thickness-wise retardations of Rth(650 nm), Rth(550 nm) and Rth(450 nm) with respect to a 650-nm-wavelength light, a 550-nm-wavelength light and a 450-nm-wavelength light, respectively, and said thickness-wise retardations satisfy the following relationship:

Rth(450 nm)>Rth(550 nm)>Rth(650 nm); and

Rth(450 nm)−Rth(650 nm)≦92 nm.

3. The LCD device according to claim 1, wherein said second optical anisotropic film has thickness-wise retardations of Rth(650 nm), Rth(550 nm) and Rth(450 nm) with respect to a 650-nm-wavelength light, a 550-nm-wavelength light and a 450-nm-wavelength light, respectively, and said thickness-wise retardations satisfy the following relationship:

Rth(450 nm)>0, Rth(550 nm)≈0;

−50 nm≦Rth(650 nm)<0 nm; and 0 nm<Rth(450 nm)≦42 nm.

4. The LCD device according to claim 1, wherein said second optical anisotropic film has three-dimensional refractive indexes satisfying the following relationship:

$(ns-nz)/(ns-nf) \geq 1$ with respect to a 450-nm-wavelength light; and $(ns-nz)/(ns-nf) \leq -1$ with respect to a 650-nm-wavelength light.

5. A liquid crystal display (LCD) device comprising:
a liquid crystal (LC) cell including a homogeneously-oriented liquid LC layer and a pair of transparent substrates sandwiching therebetween said LC layer;
a first polarizing film disposed on a light emitting side of said LC cell and including a first polarizer, said first polarizing film further including a pair of first protective layers sandwiching therebetween said polarizer, one of said first protective layers interposed between said polarizer and said LC cell having an optical isotropy, or said first polarizing film further including a first protective layer disposed further than said polarizer as viewed from said LC cell;
a second polarizing film disposed on a light incident side of said LC cell, said second polarizing film including a second polarizer and a pair of second protective layers sandwiching therebetween said second polarizer, one of said second protective layers interposed between second polarizer and said LC cell having an in-plane retardation of substantially zero and a thickness-wise retardation of 20 nm to 90 nm;
a first optical anisotropic film interposed between said LC layer and said second polarizing film, said first optical anisotropic film having an biaxial optical anisotropy and refractive indexes of ns, nf and nz in a direction of an in-plane slow axis, in a direction of an in-plane fast axis, and a thickness direction, respectively, said refractive indexes satisfying the relationship of $(ns-nz)/(ns-nf) \leq 0.5$;
a second optical anisotropic film interposed between said LC layer and said first polarizing film and having an optical axis substantially perpendicular to a surface of said LC cell, wherein:
said first polarizer has a light absorption axis perpendicular to a light absorption axis of said second polarizer; and
said in-plane slow axis of said first optical anisotropic film, an orientation of said LC layer upon absence of an applied voltage and a light transmission axis of said second polarizer are parallel to one another.

6. The LCD device according to claim 5, wherein said second optical anisotropic film has thickness-wise retardations of Rth(650 nm), Rth(550 nm) and Rth(450 nm) with respect to a 650-nm-wavelength light, a 550-nm-wavelength light and a 450-nm-wavelength light, respectively, and said thickness-wise retardations satisfy the following relationship:

Rth(450 nm)<Rth(550 nm)<Rth(650 nm); and

Rth(650 nm)−Rth(450 nm)≦92 nm.

7. The LCD device according to claim 5, wherein said second optical anisotropic film has thickness-wise retardations of Rth(650 nm), Rth(550 nm) and Rth(450 nm) with respect to a 650-nm-wavelength light, a 550-nm-wavelength light and a 450-nm-wavelength light, respectively, and said thickness-wise retardations satisfy the following relationship:

Rth(450 nm)<0, Rth(550 nm)≈0; and 0 nm<Rth(650 nm)≦50 nm; and

−42 nm≦Rth(450 nm)<0 nm.

8. The LCD device according to claim 5, wherein said three-dimensional refractive indexes of second optical anisotropic film satisfy:

$(ns-nz)/(ns-nf) \leq -1$ with respect to a 450-nm-wavelength light; and $(ns-nz)/(ns-nf) \geq 1$ with respect to a 650-nm-wavelength light.

9. The LCD device according to claim 1, wherein said first optical anisotropic film has an in-plane retardation Re(550 nm) with respect to a 550-nm-wavelength light in a range of 80 nm+α≦Re(550 nm)≦230 nm+α, and said second optical anisotropic film has a thickness-wise retardation Rth(650 nm) with respect to a 650-nm-wavelength light in a range of −50 nm+α≦Rth(650 nm)<0 nm+α and a thickness-wise retardation Rth(450 nm) with respect to a 450-nm-wavelength light in a range of 0 nm+α<Rth(450 nm)≦42 nm+α, given α representing a thickness-wise retardation Rth(550 nm) of said second optical anisotropic film with respect to a 550-nm-wavelength light.

10. The LCD device according to claim 5, wherein said first optical anisotropic film has an in-plane retardation Re(550 nm) with respect to a 550-nm-wavelength light in a range of 80 nm−α≦Re(550 nm)≦230 nm−α, and said second optical anisotropic film has a thickness-wise retardation Rth(650 nm) with respect to a 650-nm-wavelength light in a range of 0 nm+α≦Rth(650 nm)≦50 nm+α and a thickness-wise retardation Rth(450 nm) with respect to a 450-nm-wavelength light in a range of −42 nm+α<Rth(450 nm)≦0 nm+α, given a representing a thickness-wise retardation Rth(550 nm) of said second optical anisotropic film with respect to a 550-nm-wavelength light.

11. The LCD device according to claim 1, wherein said second optical anisotropic film has an optical isotropy with respect to a light having a wavelength in the range of 550±20 nm.

12. The LCD device according to claim 5, wherein said second optical anisotropic film has an optical isotropy with respect to a light having a wavelength in the range of 550±20 nm.

13. The LCD device according to claim 1, wherein said LC in said LC layer has a positive relative permittivity.

14. The LCD device according to claim 5, wherein said LC in said LC layer has a positive relative permittivity.

* * * * *